May 11, 1926. 1,584,350

E. L. BEECHER

PNEUMATIC VALVE

Filed April 8, 1924  2 Sheets-Sheet 1

INVENTOR
Eugene L. Beecher
BY
Cooper Kerr & Dunham
HIS ATTORNEYS

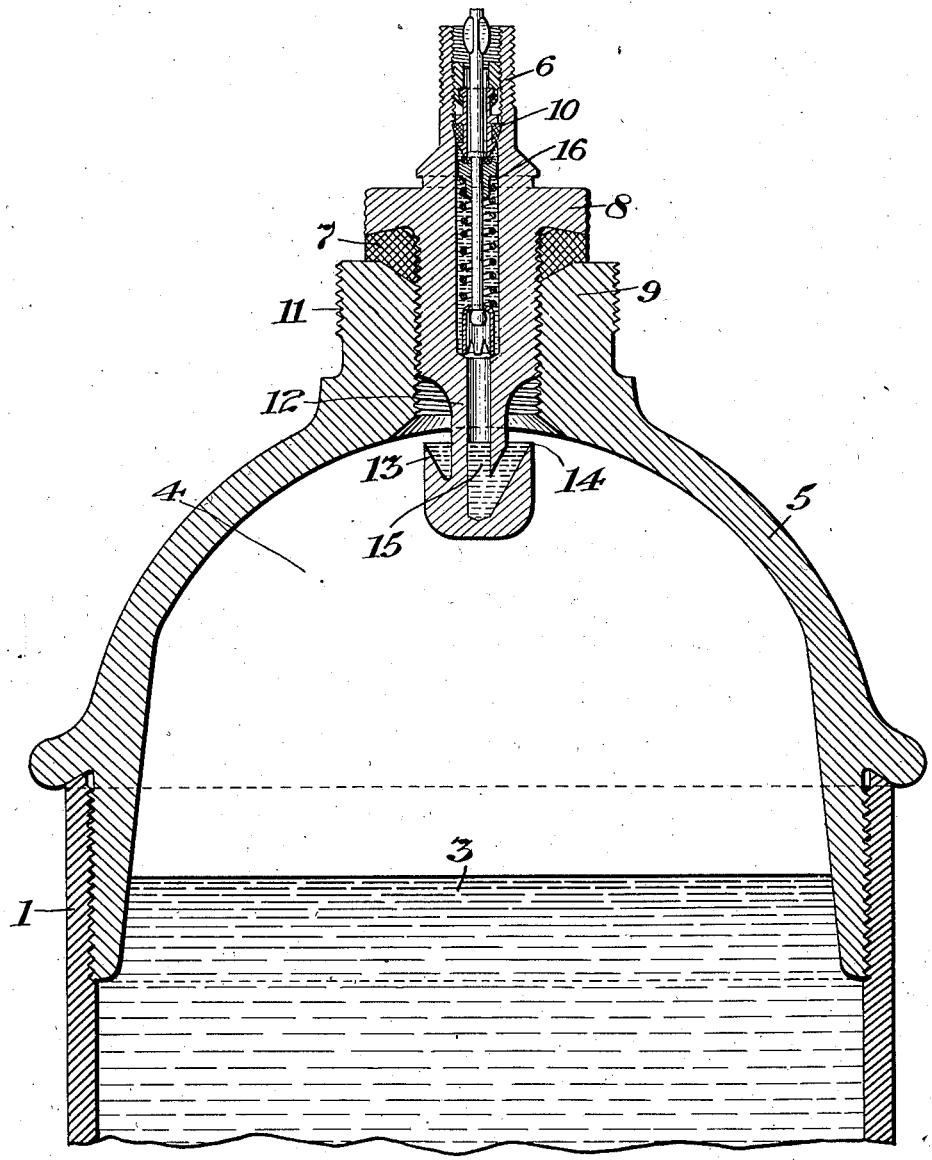

Patented May 11, 1926.

1,584,350

UNITED STATES PATENT OFFICE.

EUGENE L. BEECHER, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

PNEUMATIC VALVE.

Application filed April 8, 1924. Serial No. 704,912.

My present invention relates to liquid sealed valves for pneumatic devices and particularly to a liquid sealed valve applicable to air springs, although the device of my invention is applicable to the arts generally.

In air springs such as are used on vehicles and the like the holding of air under compression in the device for long periods of time is particularly desirable since a loss of sufficient amount of air to result in the faulty operation of the device results in damage to the device itself and to vehicle or other machine or device to which it is applied. Such a loss of air further results in considerable trouble on account of the high pressure under which air is applied to such a device and the consequent need of suitable pumping apparatus to apply air under the desired pressure. With the device of my invention as applied to such an air spring I prevent the escape of air from the spring through the valve by sealing the valve with a liquid and by further providing the sealing means with means for receiving sealing liquid in the form of the oil used in the device as such oil is agitated in the use of the spring and for holding such oil in the valve sealing position.

It is therefore an object of my invention to provide a liquid seal in a pneumatic valve as used in air cushioning or hydro-pneumatic devices the parts of which seal act automatically with said device to keep oil continually in the sealing parts.

Other objects of my invention will be readily apparent from the following description of the device of my invention.

In the accompanying drawings which form part of this application:

Fig. 2 is a similar view of the upper part of the piston showing the valve seat sealed by oil which has been carried up to it.

Figure 1:
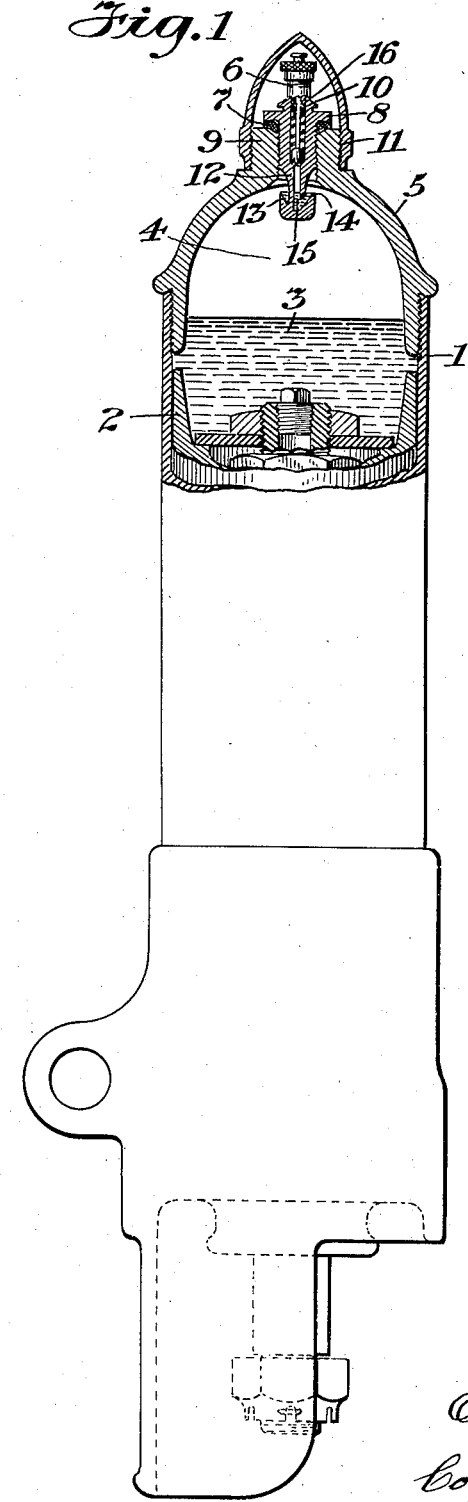
Fig. 1 is a vertical section in elevation of an air spring embodying an air valve which is sealed with a device embodying my invention.

In the drawings the cylinder 1 has supported within it and on the piston 2 the body 3 of cylinder-piston sealing oil in the cushion chamber 4. At the top of the dome 5 which closes the upper end of said cylinder 1 is the valve housing 6 which extends through said dome 5 and into said cushion chamber, it being threaded through said dome and removable therefrom. The gasket 7 between the flange 8 on the said housing and the boss 9 on said dome serves to seal the connection of the housing to the dome. Said housing is centrally bored and threaded to receive the pneumatic valve mechanism 10 which is mounted within the upper part thereof. On the outside of the part of the housing which protrudes from the dome are provided the screw threads 11 for engaging and holding a suitable cover for the valve. The lower end of said housing 6 carries an extension 12 which projects into the cushion chamber 4 and terminates in an annular cup 13 whose upper edge 14 extends circumferentially around said extension 12. The bore of the housing extends downwardly and communicates with the interior of said cup 13 at a point below said edge 14 whereby is formed by them an air passage from the outside to the interior of said cushion chamber 4 which is closed by said pneumatic valve 10. The chamber 4 is further sealed by the body 15 of oil in said cup which extends above the opening of the central bore or boss where it communicates with said cup 13. In the embodiment shown in the drawing said extension 12 and said cup 13 are made integral with said housing 6 for ease and cheapness of construction but its form without departure from the spirit of my invention can be made in separate parts.

In the use of the device of my invention the pneumatic valve 10 is mounted in the housing 6, the cup 13 filled with liquid such as oil of the kind used to seal the piston and cylinder, and the housing screwed into the boss 9 of the dome 5. Air is then admitted into the chamber 4 under the desired pressure through said valve 10, said air passing through the body 15 of oil in cup 13. After the passage of the air therethrough the oil 15 again flows to seal the air passage through the housing. Said body of oil 15 is replenished from time to time from the body of oil 3 on piston 2 which latter oil is agitated by said piston and splashed and sprayed about in said chamber 4 whereby said cup 13 catches enough thereof to fill it up and keep it filled. Should air start to leak outwardly through said valve 10 oil from cup 13 will be forced up into the bore of housing 6 and against the seat 16 of valve 10 thereby effectively sealing said valve at its seat against any further leak.

I claim:—

1. In combination with a cushioning container having reciprocating walls and sealing liquid therein, a pneumatic valve in one wall having an air passageway therethrough with a valve and seat therein, means for trapping and holding a portion of the sealing liquid in a position where it is movable against said seat by any air tending to lead outwardly to automatically effect the sealing of said valve at said seat against further movement of air outwardly therethrough.

2. In combination with a cushioning container having reciprocating walls and a sealing liquid therein, a pneumatic check valve for said walls, and means on the pressure side thereof for holding a portion of said sealing fluid in the path of air flow through said valve.

3. In combination with a cushioning container having reciprocating walls and a sealing liquid therein, a pneumatic check valve for said walls, an extension having an inner bore therethrough connecting at one end with the bore of the valve housing, and a cup member surrounding the opposite end of said extension whose edge extends above the point at which said bore opens thereinto.

4. In combination with a cushioning container having reciprocating walls and a sealing liquid therein, a pneumatic check valve for said walls, an extension having an inner bore therethrough connecting at one end with the bore of the valve housing, a cup member surrounding the opposite end of said extension whose edge extends above the point at which said bore opens thereinto, and a filling of said sealing liquid in said cup.

5. In combination with a cushioning container having reciprocating walls and a sealing liquid therein; a pneumatic check valve for said walls, an extension on the pressure side of said valve having an inner bore therethrough connecting at one end with the bore of the housing of said valve, and a cup member surrounding the opposite end of said extension whose edge extends above the point at which said extension bore opens thereinto.

6. In combination with a cushioning container having reciprocating walls and a sealing liquid therein; a pneumatic check valve for said walls, an extension on the pressure side of said valve having an inner bore therethrough connecting at one end with the bore of the housing of said valve, a cup member surrounding the opposite end of said extension whose edge extends above the point at which said extension bore opens thereinto, and a filling of said sealing liquid in said cup to a level above said opening.

In testimony whereof I hereunto affix my signature.

EUGENE L. BEECHER.